US012445958B2

(12) United States Patent
Hofmann et al.

(10) Patent No.: US 12,445,958 B2
(45) Date of Patent: Oct. 14, 2025

(54) METHODS AND APPARATUSES FOR RADIO COMMUNICATION

(71) Applicant: Robert Bosch GmbH, Stuttgart (DE)

(72) Inventors: Frank Hofmann, Hildesheim (DE);
Khaled Shawky Hassan, Laatzen (DE);
Klaus Sambale, Oberhausen (DE);
Maria Bezmenov, Hannover (DE);
Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 17/508,265

(22) Filed: Oct. 22, 2021

(65) Prior Publication Data
US 2022/0132418 A1 Apr. 28, 2022

(30) Foreign Application Priority Data
Oct. 23, 2020 (EP) .................................... 20203616

(51) Int. Cl.
*H04W 52/02* (2009.01)
*H04W 28/02* (2009.01)
*H04W 72/566* (2023.01)
*H04W 76/14* (2018.01)

(52) U.S. Cl.
CPC ... *H04W 52/0216* (2013.01); *H04W 28/0215* (2013.01); *H04W 52/0238* (2013.01); *H04W 72/569* (2023.01); *H04W 76/14* (2018.02)

(58) Field of Classification Search
CPC . H04W 52/00; H04W 52/02; H04W 52/0209; H04W 52/0212; H04W 52/0216; H04W 52/0225; H04W 52/0229; H04W 52/0238; H04W 76/14
See application file for complete search history.

(56) References Cited

U.S. PATENT DOCUMENTS

| 2018/0234973 | A1 | 8/2018 | Lee et al. |
| 2020/0229171 | A1 | 7/2020 | Khoryaev et al. |
| 2021/0250954 | A1* | 8/2021 | Li ......................... H04L 1/1854 |
| 2021/0410114 | A1* | 12/2021 | Lee ........................... H04L 1/189 |
| 2022/0046648 | A1* | 2/2022 | Kiilerich Pratas .... H04W 48/16 |
| 2023/0063472 | A1* | 3/2023 | Freda .................... H04W 76/28 |
| 2023/0262601 | A1* | 8/2023 | Ganesan .......... H04W 52/0245 |
| | | | 370/311 |
| 2023/0319950 | A1* | 10/2023 | Do ....................... H04W 76/14 |
| | | | 370/311 |

FOREIGN PATENT DOCUMENTS

| EP | 3216294 | | 9/2017 |
| EP | 3232727 | A1 | 10/2017 |
| EP | 3681106 | A1 | 7/2020 |
| WO | 2020001470 | A1 | 1/2020 |
| WO | 2020198418 | A1 | 10/2020 |

* cited by examiner

*Primary Examiner* — Robert C Scheibel
(74) *Attorney, Agent, or Firm* — Michael Best & Friedrich LLP

(57) ABSTRACT

A method for operating an apparatus (UE) comprising: determining (130), in an active mode, a state associated with a direct mode radio channel, and determining (160; 170), in the active mode, at least one subset of a plurality of radio resources of the direct mode radio channel based on the determined state.

20 Claims, 10 Drawing Sheets

METHODS AND APPARATUSES FOR RADIO COMMUNICATION

BACKGROUND OF THE INVENTION

The following description concerns advances in radio communication, in particular the sidelink.

SUMMARY OF THE INVENTION

According to a first aspect of the description, a method for operating an apparatus comprises: determining, especially in an active mode, a state associated with a direct mode radio channel, especially associated with a sidelink radio channel; and determining, especially in the active mode, at least one subset of a plurality of radio resources of the direct mode radio channel based on the determined state.

Advantageously, the direct mode radio channel is listened in the at least one subset, therefore providing power saving in dependence on the state associated with the direct mode radio channel, especially sidelink. Therefore, power saving is advantageously enabled, for example, if the determined state indicates a low usage of the direct mode radio channel.

According to an example, the state indicates a resource set in an active time and search space.

According to an advantageous example, the state associated with the direct mode channel is determined by comparing a parameter like a measured traffic and/or the decoded priorities to a corresponding configured threshold.

According to an advantageous example, the method comprises: determining, especially in the active mode, an active mode time period, especially between a lower bound and an upper bound, based on the determined state associated with the direct mode radio channel.

Advantageously, the active mode period explicitly grants access to the direct radio channel.

According to an advantageous example, the method comprises: determining an end of the active mode time period; and initiating a sleep mode, especially at least stopping a decoding of data received via the direct mode radio channel, upon the determination of the end of the active mode time period.

During the sleep mode, the UE is enabled to save power, while being still able to use the direct mode radio channel while in the active mode.

According to an advantageous example, the method comprises: determining, especially in the sleep mode, a sleep mode time period, especially between a lower bound and an upper bound, based on the determined state associated with the direct mode radio channel; determining an end of the sleep mode time period; and initiating the active mode, especially starting the decoding of data received via the direct mode radio channel, upon the determination of the end of the sleep mode time period.

Advantageously, the sleep mode time period is determined based on the determined state. For example, a vehicle-side UE can reduce its energy consumption for attending the direct mode radio channel, if it drives in an area with low or even no traffic on the direct mode radio channel.

According to an advantageous example, the method comprises: determining, especially in the active mode, a search space in frequency, especially at least one of a plurality of subchannels, in dependence on the determined state associated with the direct mode channel.

Advantageously, the search space can be determined according to the determined state associated with the direct mode radio channel. For example, a vehicle-side UE can reduce its energy consumption for attending the direct mode radio channel, if it drives in an area with low or even no traffic on the direct mode radio channel. The method according to the preceding claim, wherein the search space comprises at least one configured search space that is common for a plurality of apparatuses.

Advantageously, the common search space of the direct mode channel guarantees at least a basic communication level.

According to an advantageous example, the determination of the search space in frequency comprises: determining a first search space valid for a first period of time during the active mode; and determining a second search space valid for a second period of time subsequent to the first period in time, wherein the first search space is smaller than the second search space.

By having alternating search space sizes over time, the UE may advantageously save power and on the other side increase the available radio resources available for reception and transmission.

According to an advantageous example, the method comprises: determining a maximum search space, in particular a pre-configured maximum search space, valid for an associated period of time, especially for at least one pre-configured period of time during the active mode time period.

By determining the maximum search space, the UE is able to receive and decode the information during the associated period of time.

According to an advantageous example, the state of the direct mode radio channel comprises a ratio of a measured number of not occupied radio resources to a measured number of radio resources not occupied.

Advantageously, the channel load in form of the determined ratio indicates whether the UE has to access/listen more or less frequently the sidelink channel. Moreover, the channel load is also indicative for the search space in frequency.

According to an advantageous example, the determining of the active mode time period comprises: increasing the active mode time period if the state indicates a more congested direct mode radio channel; and decreasing the active mode time period if the state indicates a less congested direct mode radio channel.

More examples, in addition to congestion, measured parameters are used for determining the increase or decrease, the measured parameters include at least one of the following: measuring RSRP and/or RSSI of the received/sensed occupied channels (i.e., when other UEs are near; Supported TX priority classes associated with the transmission packets; and Received RX priority classes (received in the SCI TX priority field)

According to an advantageous example, the determining of the sleep mode time period comprises: increasing the search space in frequency if the state indicates a more congested direct mode radio channel; and decreasing the search space in frequency if the state indicates a less congested direct mode radio channel.

According to an advantageous example, the method comprises: listening during a first phase, especially during an initial sensing adaption phase, to the direct mode radio channel; determining, based on the listening, an occupation pattern; and determining, based on the determined occupation pattern, at least a part of the set of radio resources.

According to an advantageous example, the method comprises: determining assisting information for assisting another apparatus in determining at least one subset of a plurality of radio resources of the direct mode radio channel; and transmitting, via the direct mode radio channel, the determined assisting information.

For example, the assisting information is used to determine when should the UE have active/sleep time, e.g., assist the UE with determination of the DRX cycle or partial sensing.

According to an advantageous example, the method comprises: receiving, via the direct mode radio channel, assisting information; wherein the determination, especially in the active mode, of the at least one subset of a plurality of radio resources of the direct mode radio channel is based on the determined state and is based on the received assisting information.

Advantageously, the assisting information indicates the radio resources of the set to be determined. For example, an explicit indicator identifies the radio resources of the set. In another example, the assisting information indicates at least one of the following: Time instance to start activation mode (T_active); Time instance to end activation mode, or Time interval (duration) of the active time; Frequency location of the start of the search space; Frequency location of the end of the search space, or the number of subchannels in the search space. According to another example, the assisting information indicates an increase or decrease of the number of radio resources in the at least one set. The method according to one of the preceding claims, wherein subsequently determined subsets overlap in at least one radio resource of the direct mode radio channel.

According to an advantageous example, the method comprises: allocating, especially in the active mode, at least one radio resource of the determined subset; and encoding and transmitting, especially in the active mode, data on the at least one allocated radio resource, especially on at least one transmit radio resource of the direct mode radio channel.

According to an advantageous example, the method comprises: decoding, especially in the active mode, data received via the at least one radio resource of the determined subset, especially on at least one receipt radio resource of the direct mode radio channel.

According to a second aspect of the description, an apparatus comprises: determining means to determine, especially in an active mode, a state associated with a direct mode radio channel, especially associated with a sidelink radio channel; and determining means to determine, especially in the active mode, at least one subset of a plurality of radio resources of the direct mode radio channel based on the determined state.

According to a third aspect of the description, a method for operating an apparatus comprises: knowing, for example via a resource pool configuration, a mapping between a priority class associated with a transmission via a direct mode radio channel, especially via a sidelink channel, and a radio resource indicator, in particular a radio resource offset indicator, wherein, in particular, the radio resource indicator is a time offset in milliseconds or transmission slots; receiving, especially via at least one control radio resource of the direct mode radio channel, control information comprising the priority class; determining the radio resource indicator based on the mapping and based on the received priority class; and/or is based on a destination identifier, especially being part of the at least one control radio resource, the destination identifier identifying the apparatus; determining at least one radio resource, especially at least one shared radio resource of the direct mode radio channel, based on the radio resource indicator, especially also based on the position of the radio resource on which the control information was received; receiving data via the radio resource of the direct mode radio channel; especially by at least enabling an encoding of at least the determined at least one radio resource of the direct mode radio channel.

Advantageously, the receiving UE is enabled to save power as data is expected according to the known mapping.

According to an advantageous example, the method comprises: reducing the reception capability on radio resources of the direct mode radio channel, especially at least disabling a decoding of radio resources of the direct mode channel, after receipt of the control information, especially until a subsequent radio resource associated with further control information.

Advantageously, the UE decides to receive, for example a 2nd or 3rd retransmission of the data, either based on priority or destination identifier.

According to a fourth aspect, an apparatus comprises: knowing means to know, for example via a resource pool configuration, a mapping between a priority class associated with a transmission via a direct mode radio channel, especially via a sidelink channel, and a radio resource indicator; receiving means to receive, especially via at least one control radio resource of the direct mode radio channel, control information comprising the priority class; determining means to determine the radio resource indicator based on the mapping and based on the received priority class; determining means to determine at least one radio resource, especially at least one shared radio resource of the direct mode radio channel, based on the radio resource indicator, especially also based on the position of the radio resource on which the control information was received; receiving means to receive data via the radio resource of the direct mode radio channel, especially at least by at least enabling an encoding of at least the determined at least one radio resource of the direct mode channel.

For example, the at least one radio resource is determined not earlier than the radio resource offset indicator.

According to a fifth aspect of the description, a method for operating an apparatus is provided, the method comprising: knowing, for example via a resource pool configuration, a mapping between a priority class associated with a transmission via a direct mode radio channel, especially via a sidelink channel, and a radio resource indicator; determining a priority class for data to be transmitted; determining a control information comprising the priority class; transmitting, especially via at least one control radio resource of the direct mode radio channel, the control information; transmitting, via a first radio resource, especially via at least one shared radio resource of the direct mode radio channel, the data; determining the radio resource indicator based on the mapping and based on the determined priority class; determining a second radio resource, especially at least one shared radio resource of the direct mode radio channel, based on the mapping and based on the determined priority class; and re-transmitting, via the second radio resource, especially via the at least one shared radio resource of the direct mode radio channel, the data.

Advantageously, the transmitting UE obeys the radio resource indicator and enables via a sidelink control signaling the receiving device to catch at least a re-transmission if the receiving device misses the first transmission.

According to an example, a transmitting UE obeys the radio resource indicator and enables via a sidelink control signaling the receiving device to catch at least a re-transmission if the receiving device misses the first transmission.

According to a sixth aspect of the description, an apparatus is provided that comprises: knowing means to know, for example via a resource pool configuration, a mapping between a priority class associated with a transmission via a direct mode radio channel, especially via a sidelink channel, and a radio resource indicator; determining means to determine a priority class for data to be transmitted; determining means to determine a control information comprising the priority class; transmitting means to transmit, especially via at least one control radio resource of the direct mode radio channel, the control information; transmitting means to transmit, via a first radio resource, especially via at least one shared radio resource of the direct mode radio channel, the data; determining means to determine the radio resource indicator based on the mapping and based on the determined priority class; determining means to determine a second radio resource, especially at least one shared radio resource of the direct mode radio channel, based on the mapping and based on the determined priority class; and re-transmitting means to re-transmit, via the second radio resource, especially via the at least one shared radio resource of the direct mode radio channel, the data.

DETAILED DESCRIPTION

Figure 1:
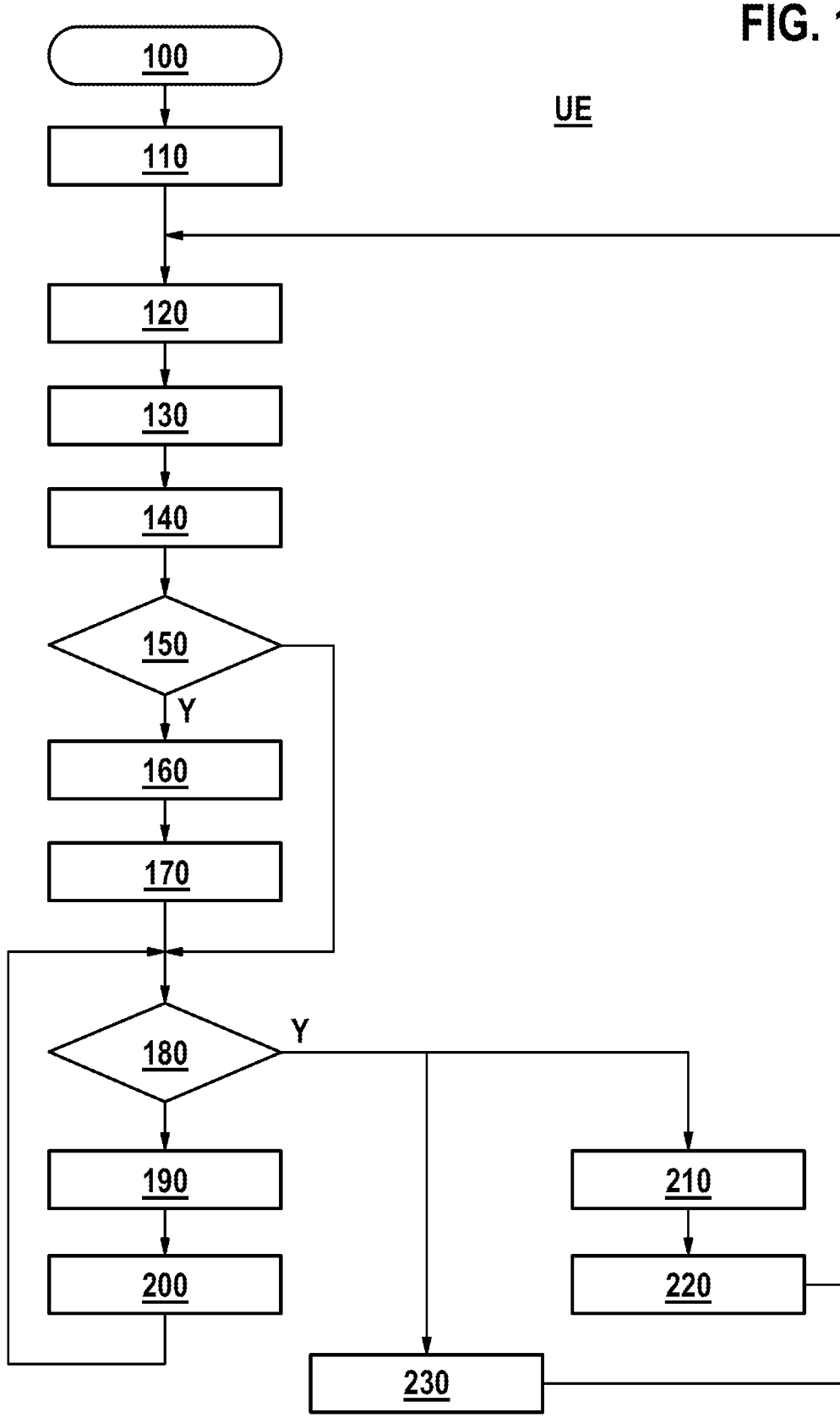
FIGS. 1, 8, and 9 each depict a schematic flow chart.

FIG. 1 depicts a method for operating an apparatus UE like a user equipment or radio terminal. The UE determines (according to determining or processing means 130), especially in an active mode, a state associated with a direct mode radio channel, especially associated with a sidelink radio channel.

The direct mode channel is a radio channel that allows direct communication between radio terminals. The direct mode radio channel can be operated in a managed mode by a managing entity and in an unmanaged mode without such a managing entity. The direct mode radio channel is, for example, a sidelink channel that comprises the PSCCH, physical sidelink control channel; the PSSCH, Physical sidelink shared channel; and the PSBCH: Physical sidelink broadcast channel.

The state associated with a direct mode radio channel especially comprises: a load of the direct mode radio channel that is measured by listening to at least a part of the direct mode radio channel, and/or a state of a direct mode transmission demand associated with a service and/or an application being executed on the UE, and/or a state of a direct mode reception demand associated with a service and/or application being executed on the UE.

For example, the state of the direct mode radio channel comprises a ratio of a measured number of not occupied radio resources to a measured number of radio resources not occupied.

The UE determines (according to determining or processing means 160; 170), especially in the active mode, at least one subset of a plurality of radio resources of the direct mode radio channel based on the determined state. The processing according to processing means 160, 170 is associated with a corresponding processing time.

The UE determines (according to determining or processing means 160), especially in the active mode, an active mode time period T_active, especially between a lower bound and an upper bound, based on the determined state associated with the direct mode radio channel. According to an example, the determining via determining means 160 of the active mode time period T_active comprises: increasing the active mode time period T_active if the state indicates a more congested direct mode radio channel; and decreasing the active mode time period T_active if the state indicates a less congested direct mode radio channel.

The UE determines (according to determining or processing means 170), especially in the active mode, a search space in frequency, especially at least one of a plurality of sub-channels, in dependence on the determined state associated with the direct mode channel. According to an example, the determining via the determining means 170 of the sleep mode time period T_inactive comprises: increasing the search space in frequency if the state indicates a more congested direct mode radio channel; and decreasing the search space in frequency if the state indicates a less congested direct mode radio channel.

According to an example, the step 170 is not explicitly related to the determination of T_inactive or sleep mode. The determination of T_inactive happens in a processing time (CPU processing time). T_inactive is step-window (N1)−T_active. The determining of the radio resources at least one of the following is considered: Time instance to start activation mode (T_active); Time instance to end activation mode, or Time interval (duration) of the active time; Frequency location of the start of the search space; Frequency location of the end of the search space, or the number of subchannels in the search space.

As part of the adaptation process, longer sleeping periods are also possible. For instance, a VRU, Vulnerable Road User, (or UE that saves power) may go into longer sleep (longer DRX) by, e.g., setting the sensing-on time (N) and/or DRX active time (T_active) to zero for a number of consecutive DRX cycles to zero. Additionally, the UE may force the search space to zero (i.e., having similar effect like T_active=0). This may be conducted based on several factors, e.g., the current available applications traffic/messages generated by upper layers or based on upper layer signaling (e.g., based on UE mobility or current location etc.).

The UE determines (according to determining or processing means 180) an end of the active mode time period T_active.

The UE initiates (according to initiating means 180) a sleep mode, especially at least stopping a decoding of data received via the direct mode radio channel, upon the determination of the end of the active mode time period T_active.

The UE initiates (according to initiating means 180) the active mode, especially starting the decoding of data received via the direct mode radio channel, upon the determination of the end of the sleep mode time period.

The UE determines (according to determining or processing means 190), especially in the sleep mode, a sleep mode time period T_inactive, especially between a lower bound and an upper bound, based on the determined state associated with the direct mode radio channel.

The UE determines (according to determining or processing means 200) an end of the sleep mode time period T_inactive.

The UE allocates (according to allocating means 210), especially in the active mode, at least one radio resource of the determined subset. The UE encodes and transmits (according to encoding means and transmitting means 220), especially in the active mode, data on the at least one allocated radio resource, especially on at least one transmit radio resource of the direct mode radio channel.

The UE decodes (according to encoding means 210), especially in the active mode, data received via the at least one radio resource of the determined subset, especially on at least one receipt radio resource of the direct mode radio channel.

According to an example, the UE determines (according to determining or processing means) assisting information for assisting another apparatus in determining at least one subset of a plurality of radio resources of the direct mode radio channel. The UE transmits (according to transmitting means), via the direct mode radio channel, the determined assisting information.

The UE receives (According to receiving means of configuring means 110), via the direct mode radio channel, assisting information. The determination 160; 170, especially in the active mode, of the at least one subset of a plurality of radio resources of the direct mode radio channel is based on the determined state and is based on the received assisting information. In other words, the UE collects its (pre-)configured parameters (e.g., N1, N2, W1, W2, SCSS some thresholds). The UE may also track configured information about possible assisting information for power saving, e.g., if partial sensing, DRX values, and search spaces are transmitted from an assisting UE to an assisted UE. Once UE is configured, the UE starts to track information previously measured or identified by the UE in previous time slots, e.g., CBR, COR, available CR, avg/max RSSI/RSRP, etc.

In other words, FIG. 1 comprises the following steps: starting 100 a power saving mode; configuring 110 the power saving mode; reading 120 measured parameters; analyzing 130 the traffic and decoded received priorities; comparing 140 the traffic and/or the decoded priorities to a corresponding threshold Thr_SA, Thr_CBR; determining 150, based on the comparison, whether a re-adaption should be conducted; if the affirmative, adapting 160 a sensing time period T_active; if the affirmative, adapting 170 a search space in frequency Wx; determining 180, whether the apparatus UE is in active mode; if the affirmative, then the apparatus UE accesses 210 the sidelink in dependence on T_active and Wx and transmits 220 data via the sidelink channel; otherwise, the apparatus UE computes 190 T_inactive; the UE stays 200 in inactive mode according to which at least the sidelink is not decoded; after lapsing of the time period T_inactive, the apparatus UE continues with step 180.

Instead of a predefined/fixed sensing time, i.e., limited to T_active N slots, and fixed search space, i.e., limited to W1 subchannels, we propose adaptive selection of these T_active time (e.g., Nx slots) and adaptive selection for the search space (e.g., Wx subchannels).

Additionally, the UE may be configured/pre-configured with some initial T_active sensing values, e.g., a maximum T_active (N1 slots) and a minimum sub-sensing window T_active (N2 slots). The UE may also be configured with a maximum search space W1 subchannels and a minimum search space W2 channels. Wherein the UE can adaptively select between the configured/pre-configuration values (i.e., T_active (Nx-slots) between N1 and N2 slots and Wx subchannels between W1 and W2 subchannels).

For adapting sensing, control decoding, and data reception period, the UE adapts (optimizes) its active duration in time-domain and the associated search space in frequency-domain based on measured, sensed, or identified parameters, e.g.:

decoded SCI scheduling assignments (SA) and occupied/reserved resources (the more SCI with SA/reservations the UE receives, the wider the search space should be and the longer sensing periods should be),
maximum/average measured RSRP and/or RSSI,
channel busy ratio (CBR) measurements,
Channel occupancy ratio (CO) (i.e., remaining X % available resources),
UE capability/UE supported features/UE Category
UE power saving Class
Supported TX priority classes
Received RX priority classes
Supported V2X NRU service, e.g., basic services has limited time-frequency resources and advanced services has wider time-frequency resources
Received assisting information either from vehicular UEs or road-side units (i.e., via sidelink assisting information)
wherein each of the previous parameters can be used to adapted sensing time and search space frequencies.

Herewith, a threshold is set for each of the previous metrics, such that if any of the previous measured values: exceeding a threshold or subceeding a threshold.

The UE selects and/or re-selects a sensing time and control channel search space between some configured/pre-configured values. For example, if the scheduling assignment percentage in a slot (or the average percentage in multiple slots or for an evaluation period) exceeds a threshold Thr_SA_max, then the UE triggers the adaptation process and enlarges sensing/sub-sensing window and/or the search space.

For example, if the occupancy ratio in percentage exceeds a certain threshold, e.g., Thr_COR, i.e., the selected sub-sensing channel has enough free resources, then the UE triggers the adaptation process and reduces the sensing/sub-sensing window and/or the search space.

According to an example, if the UE is involved in sidelink communication for V2X services, the UE checks the received priority classes and the possible associated services for these cases. Hence, if the classes exceed a threshold Thr_Priority, the UE triggers the adaptation process and enlarges sensing/sub-sensing window and/or the search space.

In another example, the UE is configured by higher layer to receive an indicator (the assisting information) to either enlarge or reduce the sensing/sub-sensing window and/or the search space in a predefined method.

In another example, the UE is configured by higher layer to receive assisting information from other devices/UE (e.g., other UEs equipped in vehicles, roadside units, or commercial devices) identifying possible needs/conditions to either reduce or enlarge the sensing/sub-sensing window and/or the search space. Wherein the assisting information may comprises the following:

Time instance to start activation mode (T_active)
Time instance to end activation mode, or Time interval (duration) of the active time
Frequency location of the start of the search space
Frequency location of the end of the search space, or the number of subchannels in the search space.

Figure 2:
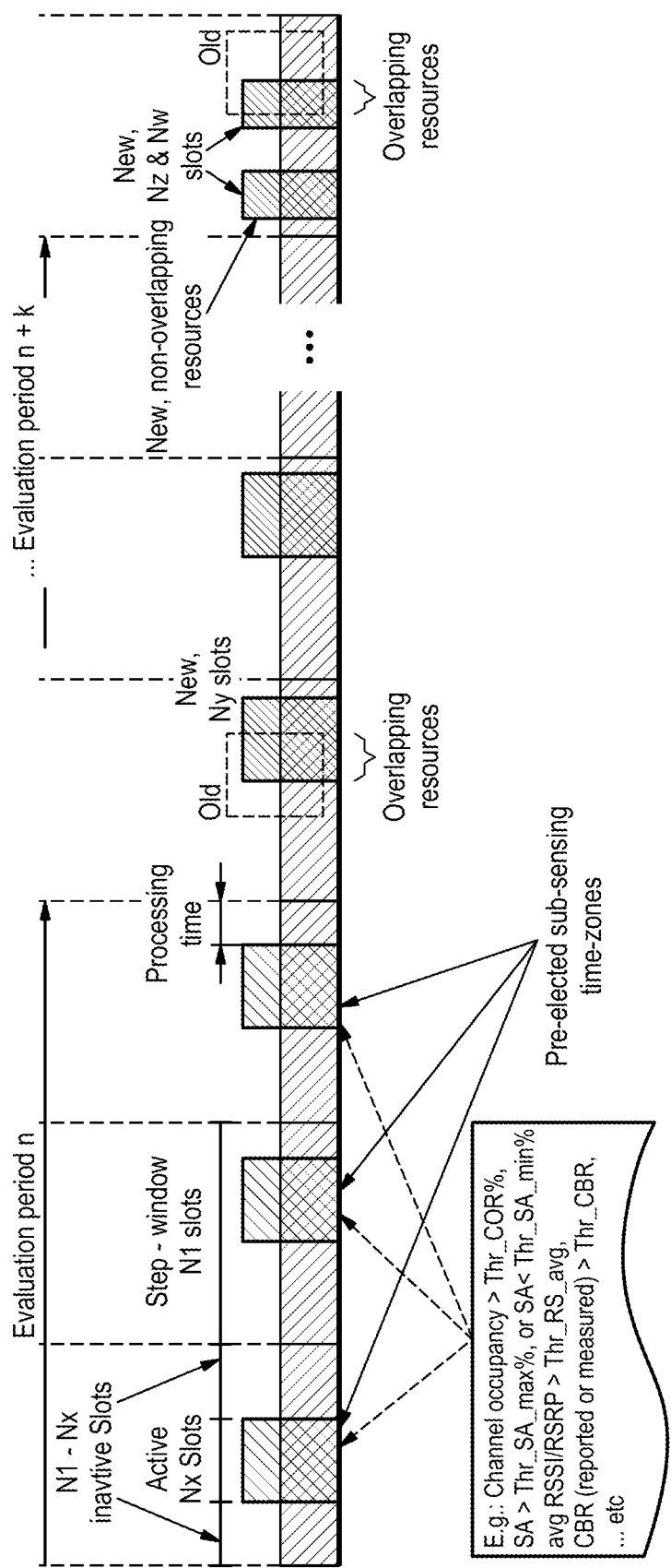
FIG. 2 depicts a scenario where a UE selects a sub-sensing window.

FIG. 2 depicts a scenario where the UE selects a sub-sensing window where its DRX cycle (if defined) or the active sensing time is equal to Nx slots (i.e., T_active), wherein the UE baseband processing in the remaining time (N1−Nx) may be inactive (i.e., T_inactive). The sub-sensing window may be repeated every step-window (i.e., N1) periodically (with period P of a maximum of N1 slots). Where the period may be configured or pre-configured or may be computed based on the packet delay budget. Additionally, the UE may have multiple sub-sensing windows in a slot forming a pattern, which may be periodic or aperiodic.

In the scenario in FIG. 2, the UE is may have an evaluation (evaluation period n) for its sensing/DRX period, where the UE may execute a process to read, measure, or identify parameters according to the state associated with the direct mode radio channel for evaluation. Within a processing time, the UE may compute a new sub-sensing window (e.g., with Ny slots) for the next upcoming sensing steps/periods. In this case, the UE may slide around the old sub-sensing window or the UE may select more than one new sub-sensing windows. The next sub-sensing windows may be bigger or smaller than an old sub-sensing window. The UE can have multiple configured/pre-configured evaluation periods. In another form, a multiple sub-sensing windows in a one step-window (of length N1 slots) may form a pattern, where the pattern can be repeated periodically or a periodically in each step-window.

In other words, in FIG. 2 is depicted that subsequently determined subsets overlap in at least one radio resource of the direct mode radio channel.

Figure 3:
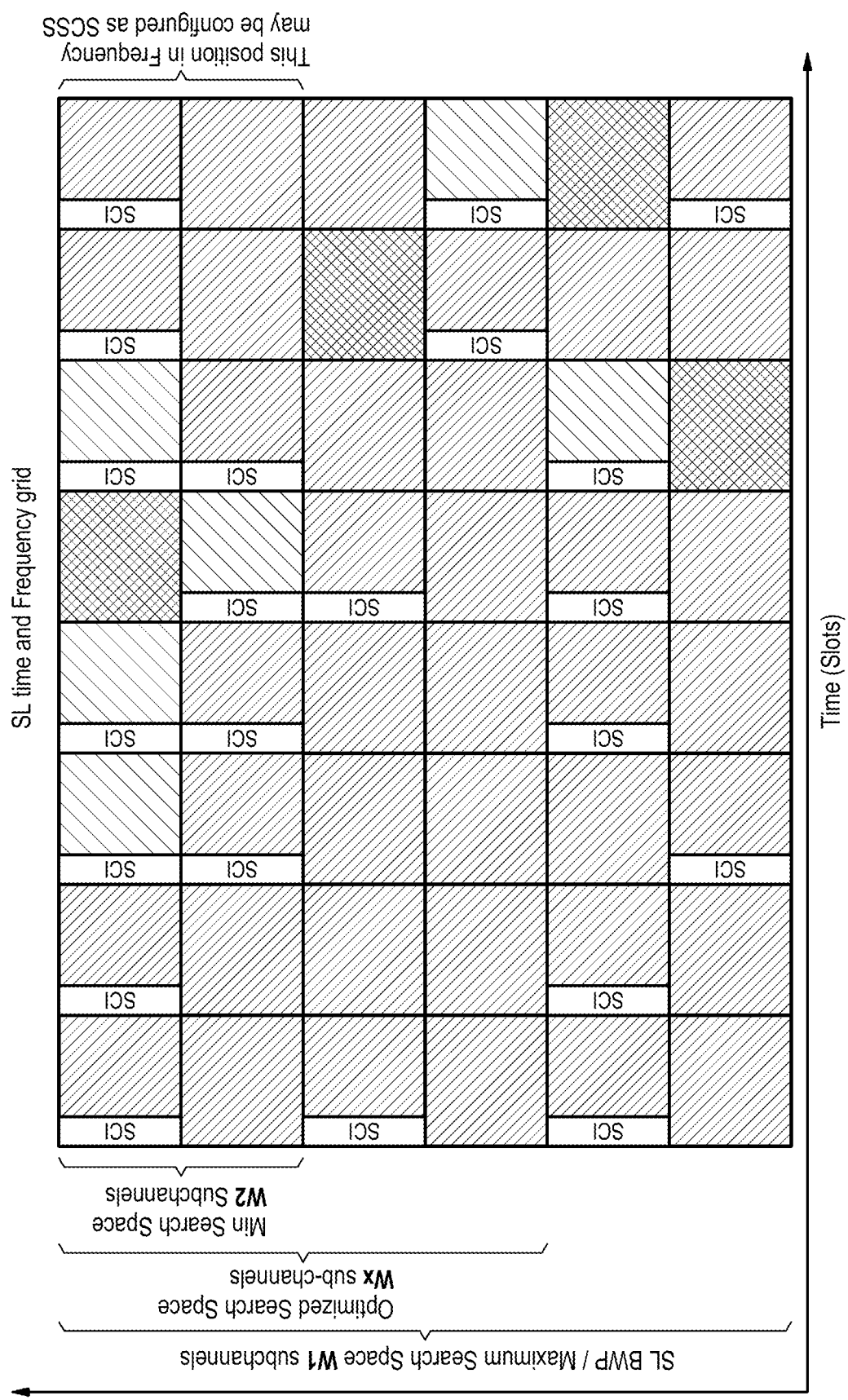
FIG. 3 depicts a search space adaptation.

FIG. 3 depicts a search space adaptation between a minimum (pre-)configured value W2 subchannel and a maximum (pre-)configured value W1 subchannels. The minimum viable search space (e.g., W1 subchannels) should include enough information to decoded at the UE and do not miss critical information, i.e., with high priority. It should also include candidate resources for future transmission opportunity for the power saving UE.

Figure 7:
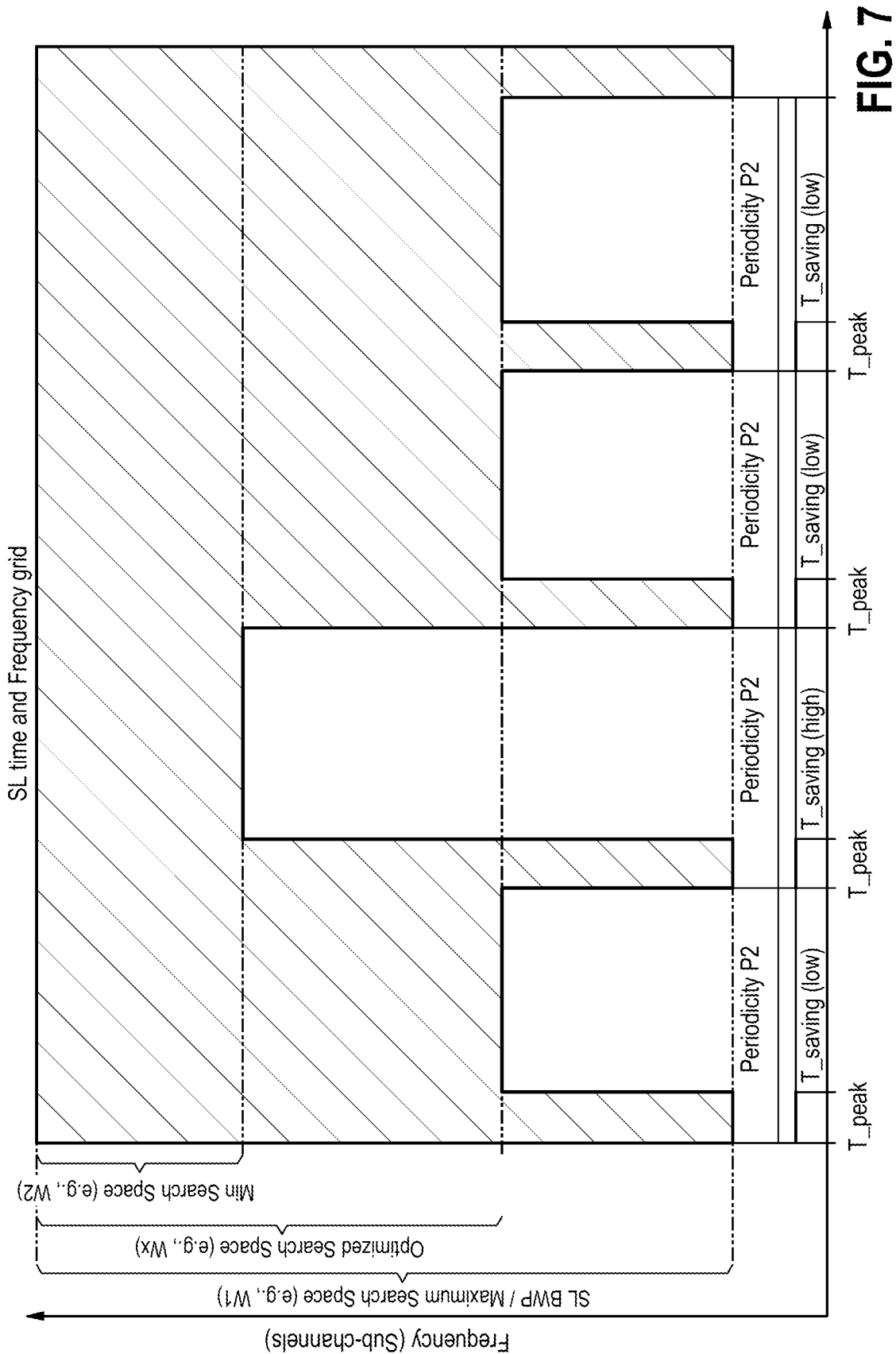
FIG. 7 depicts a determination of the search space in frequency.

In one example, if a minimum search space and a (new) sidelink common search space (SCSS) is (pre-)configured, where its position in frequency/time is also (pre-)configured for sidelink communication (e.g., for VRU TX/RX with other V2X traffic), the critical and important information, e.g., with high TX priority, should be transmitted in this space (see FIG. 7 for SCSS position configuration).

However, if the UE (e.g., VRU) would like to transmit additional information, e.g., with a lower priority, the UE may adapt (increase/enlarge) it search space to, e.g., Wx subchannels, around this defined minimum viable search space, In this case, the UE can use more resources for transmission without not congesting the minimum viable SCSS. Moreover, the optimized search space may also be used to receive some advanced use cases messages. This should be helpful for some mobility use case and UEs with higher power capabilities, e.g., e-bike and UEs with high battery levels.

In other words, the search space comprises at least one configured search space, the minimum search space that is common for a plurality of apparatuses.

Figure 4:
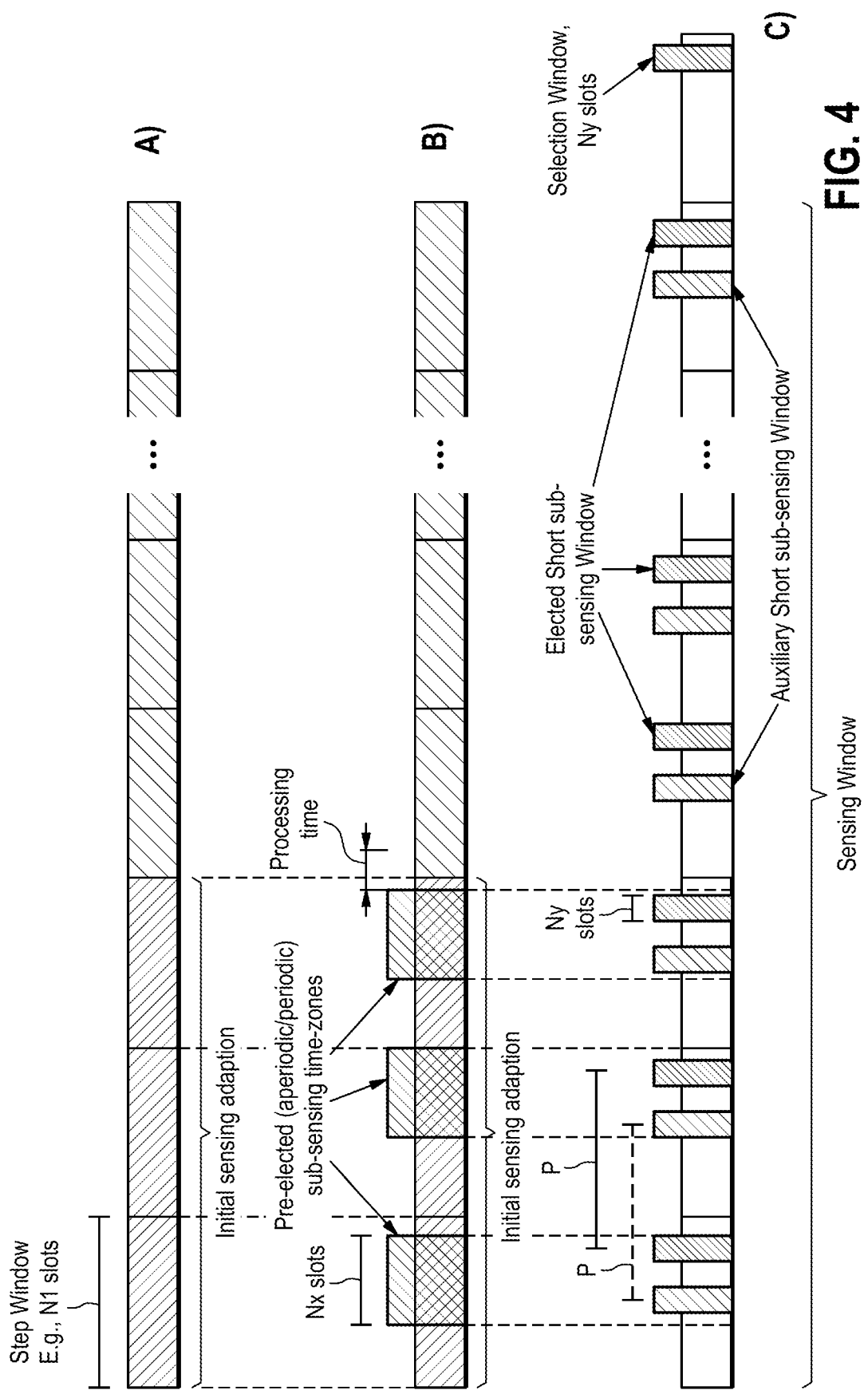
FIG. 4 depicts an adaptive sensing window.

FIG. 4 depicts an adaptive sensing window with an initial training and adaption phase. According to an adaption aspect of the sub-sensing window in time domain, where the UE is able to adapt its values (in time slot counts or milliseconds) between some configured values.

For example, the T_active time is configured with a maximum-on initial value, e.g., N1 slots. Wherein, an adaptation process at the UE may select another sensing time and/or DRX time, e.g., T_active=Nx slots, based on the state associated with the direct mode radio channel. Herewith, the UE performs sensing (for T_active) and performs sleeping (for—T_inactive) and can be optimized between these configured/pre-configured sensing times, such that:

T_active=N1 slots (maximum possible step window) and T_inactive=0

T_active=N2 slots (minimum possible sub-sensing window) and T_inactive=N1−N2 slots T_active=Nx slots, Ny slots, etc. (optimum/adapted value sub-sensing window between N1 and N2) and T_inactive=N1−Nx slots, N1−Ny slots, etc.

Nx is adapted in in time domain, and we are presenting different variants.

For example, initial Sensing adaptation phase for identifying a new sub-sensing window is explained now. The UE starts with an initial sensing phase (e.g., of length M step-window/M*N1 slots, where M is (pre-)configured) for adapting the sub-sensing value if adaptation is triggered for evaluation/re-evaluation (based on the at least one state associated with the direct mode radio channel). Hence, the UE adaptively finds one or more possible short sub-sensing window(s) in a subsequent step-window. A processing time T_proc is needed before selecting an optimized sub-sensing window. FIG. 4 depicts this variant for adapting the Ny slots, i.e., for 1 or 2 selected sub-sensing windows in a subsequent step window. FIG. 4 depicts only a decreasing Nx/Ny; however, an increasing sub-sensing window can be conducted similarly.

The UE gradually/adaptively moves from N1 to Ny, where N1>Ny in this case, after a (pre-)configured initial sensing adaption phase. It is also assumed that the UE can reduce its sub-sensing window gradually in steps between, i.e., some value N1 and N2, where the steps can follow arbitrary or pre-configured values. Hence, the UE may start with a short initial sensing adaptive phase/training phase for M*N1 slots (e.g., 3 times the step window shift, where N1 is the step window which can be configured/pre-configured).

After this initial phase and, additionally, after a short processing time, the UE finds the possible periodic minimum/short sub-sensing window (i.e., with period P=N1 (in this case)). The UE may elect possible, gradually decreasing, periodic short sub-sensing window(s) iteratively until it converges to a minimum value>=N2.

According to an example, the UE may only select a selection window for one-shot transmission or for a multiple/periodic transmission reservations.

According to an example, UE listens (according to listening means) during a first phase, especially during an initial sensing adaption phase, to the direct mode radio channel. The UE determines (according to determining or processing means), based on the listening, an occupation pattern. The UE determines (according to determining or processing means), based on the determined occupation pattern, at least a part of the set of radio resources.

Figure 5:
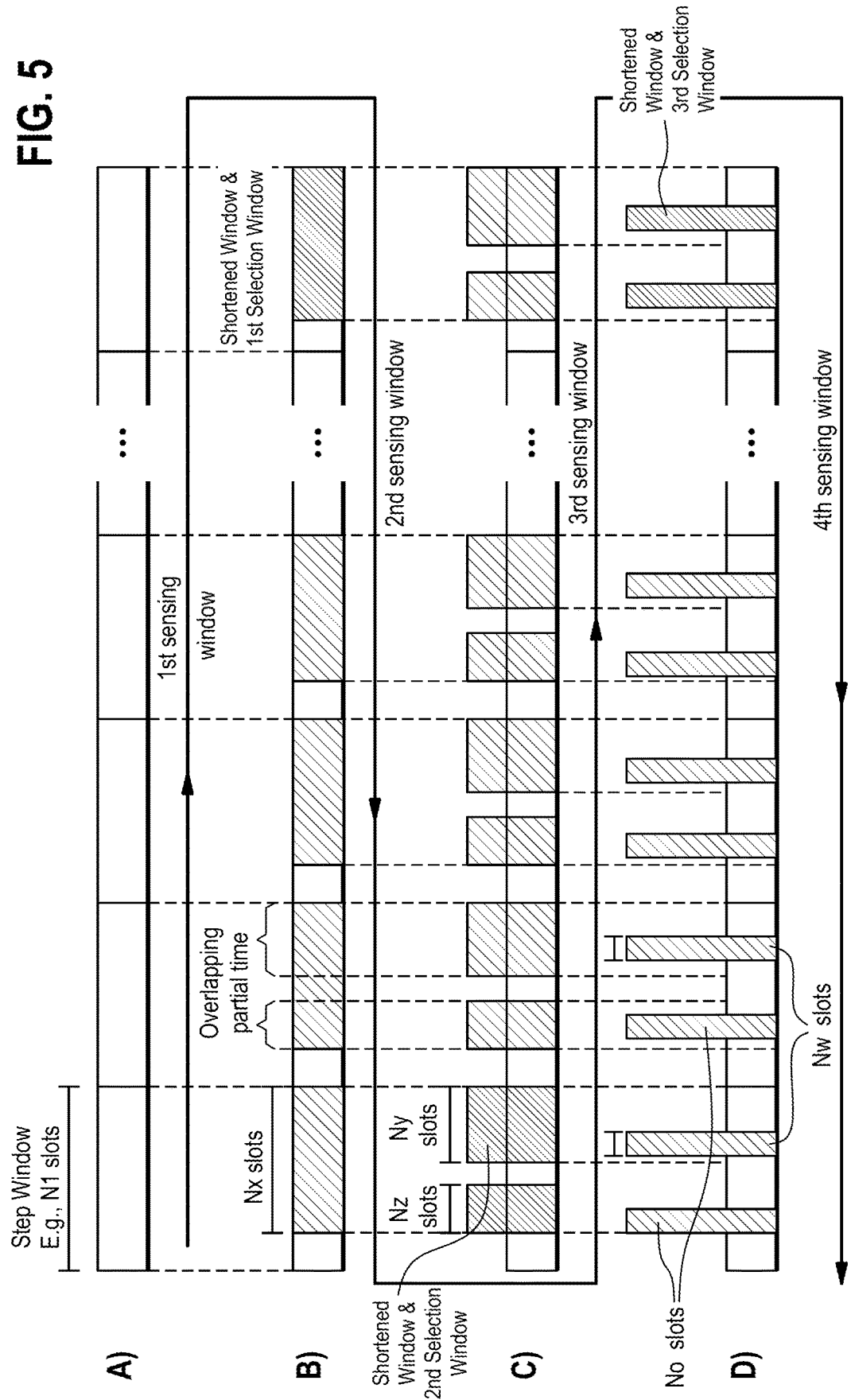
FIG. 5 depicts gradually adaptive sub-sensing window per sensing window.

FIG. 5 depicts gradually adaptive sub-sensing window per sensing window. The UE gradually selects/adapts one or more different sub-sensing window sizes (retrospectively) after finishing the complete sensing window (e.g., 1100 ms or 100 ms), where a processing time T_proc is needed before selecting an optimized selection window. In this case, the adaptation may happen:

after passing one complete sensing window, or when the UE is triggered by measurements (e.g., CBR, SCI decoding, number of Candidate resources) for re-evaluation within the complete sensing window, or when triggered by upper layers, e.g., when speed changes, when the UE battery status or UE category changes, or based on messages from an application server or roadside units, or When triggered by an assisting UEs In any of the above cases, the UE shall perform an adaption and selection of a new sub-sensing window in a subsequent complete sensing window. The new sub-sensing window(s) may only contain some/partial overlapping with the previous sub-sensing window.

FIG. 5 depicts the case when the UE gradually adapts the sub-sensing window from one complete sensing window to another, wherein the UE may select a new (periodic/aperiodic) sub-sensing window. Each time the UE finishes a complete sensing window, the overlapping time between an old and a new sub-sensing window is a possible selection window as well, i.e., starting from the first most sub-sensing window in the subsequent complete sensing window.

According to another example, triggering sub-sensing adaption is done based on assisting information on sidelink. The UE adapts the sensing time (Nx) based on sidelink assisting information sent via other UEs (which could be other vehicular UEs, a roadside units and/or a commercial UEs). Herein, the assisting information may directly dictate the recommended sensing time or the information may only support the UE to compute its new sensing time. However, If the UE is receiving multiple assisting information messages (i.e., from multiple TX assisting UEs), the said RX UE may consider the following for adapting the sensing time: a maximum sensing time, or a common sensing time, or an average sensing time.

Figure 6:
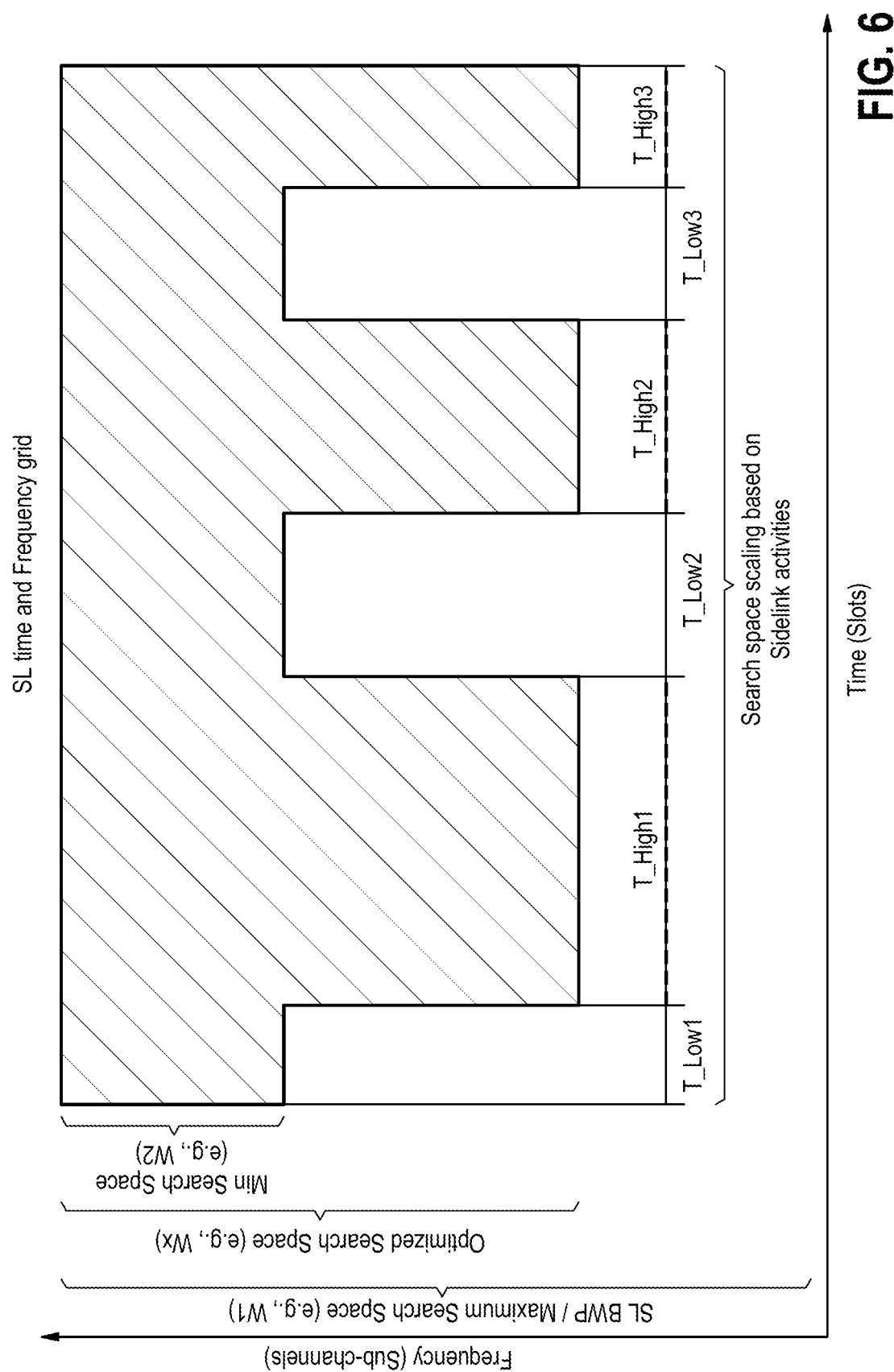
FIG. 6 depicts an adaptive search space.

FIG. 6 depicts an adaptive search space between high access and low access requirements.

The sidelink search space can be defined as the frequency domain/band size (measured in Hertz, number of subchannels, number of resource blocks, etc.) where the UE can search and scan for control information (in this case SCI).

The UE performs frequency search space optimization between some possible configured/pre-configured values, such that:

W1 sub-channels: the maximum search space, which is equal to, or small than the active BWP W2 sub-channels: the minimum sidelink common search space (SCSS); W2 may be (pre-)configured or may be computed based on one or more of the parameters based on the at least one state associated with the direct mode radio channel;

Wx sub-channels: the optimized/adapted search space based on the at least one state associated with the direct mode radio channel;

Note: when sensing time set by the UE to zero, search space is also forced to zero, and vice versa Herewith, the UE may gradually adapt the search space between a maximum search space (e.g., Sidelink active BWP) and a (minimum) configured/pre-configured search space, wherein, based on the at least one state associated with the direct mode radio channel, the UE may compute the Delta_W (e.g., Delta_W=Wx−W2), wherein the enlarged search space should have a better decoding probability and allowing sending outstanding transmissions.

The reduced search space may strive for having power saving and conducting only basic capabilities On the one hand, with the knowledge of the UE's individual traffic and the offered load (when sidelink power saving is initiated), the UE may be able to choose a suitable search space for consecutive periods to further reduce power consumption. On the other hand, this may also limit the UE SCI decoding capability in frequency make the UE losing, e.g., data. However, this is to be selected to fit some mandatory UE capability or required safety sidelink transmission.

Similar to the adaption in time domain, the UE that performs sidelink limited/partial sensing or subject to power saving may also be configured with different sidelink search space capabilities. Therefore, it can adapt the sidelink control channel (SCI) decoding search space between some configured/preconfigured values, wherein the optimum search space size is a function of (one or more of the following):

the UE capability/UE Category

UE power saving Class.

Supported priority classes

Supported V2X/VRU service, e.g., where common service are configured to be sent on the sidelink common search space, wherein this could be fixed or best-effort the search space configuration sent by other UEs as an assisting information, e.g., a road-side unit may assist VRU to broaden/shrink their search space.

Additionally, the UE may be configured with a sidelink common search space (SCSS), which has a certain frequency location (i.e., subchannel index), a certain time domain (i.e., bitmap or duration), and a minimum search space (e.g., N2). Hence, the UE adapts the search space between a maximum search space (e.g., Sidelink active BWP) and a (minimum) configured/pre-configured SCSS defined above, such that:

The UE start with a wide search space (e.g., <BWP) and try to search in and around a SCSS (if configured).

The UE changes (increase or decrease its search space based on the previous embodiment) gradually until reach optimum communication capability. This can be measured by the number of successful decoded message with high priority (when RX) or the fulfillment of the packet delay budget (PDB) (e.g., reducing the PDB) (when TX).

In the following, further variant for adapting a sidelink search space for power saving are discussed.

Flexible aperiodic adaptation of SL search space is described. The UE, when active, may expand its search space for Wx (where Wx<=W1) for a time T_high and then may return back to W2 for a time T_low, wherein the first time the UE has high access chance (TX/RX) than the second time, wherein the high access chance based on the at least one state associated with the direct mode radio channel. During inactive time (when the UE is sleeping), the minimum search space may fallback to zero sub-channels (not illustrated in FIG. 6). In FIG. 12, the high-access time and the low-access time may not be equal and may only depends on either channel load or other UEs transmission priorities or the said UE internal traffic conditions and priorities.

FIG. 6 reveals that the determination of the search space in frequency comprises: The UE determines (according to determining or processing means) a first search space valid for a first period of time during the active mode; The UE determines (according to determining or processing means) a second search space valid for a second period of time subsequent to the first period in time, wherein the first search space is smaller than the second search space.

FIG. 7 depicts periodic maximum search space scanning. The UE adapts its control channel decoding searching space such that it is periodically (with a period P2) scanning a wide search space (e.g., Wx<=W1) for a certain short time T_peak, where P2 and/or T_peak may be (pre-)configured or computed, e.g., from the state associated with the direct mode radio channel. Thereafter, the UE returns to a narrower search space (optimized, between Wx/W1 and W2) for a time T_saving, wherein the optimization of the search space value(s) after T_peak (Wx and T_saving) are function of the determined state of the direct link communication channel and the parameters received during T_peak scanning/sensing.

In FIG. 7, the periodic search space flexible scaling/adaption is depicted with T_peak using W1 as a maximum search space, which comes every period P2. During the T saving time, the UE may scan down to W2 subchannels search space or zero sub-channels when the UE is in a sleeping mode.

The UE determines (according to determining or processing means) a maximum search space, in particular a pre-configured maximum search space, valid for an associated period of time, especially for at least one pre-configured period of time during the active mode time period T_active.

Figure 8:
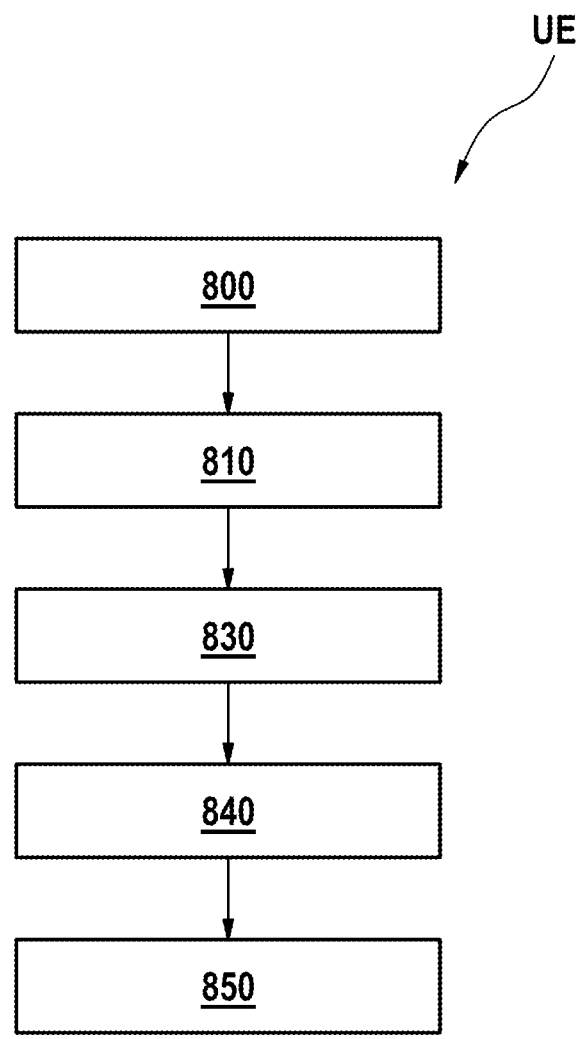

According to an example, adapting search space based on the received assisting information. The UE adapt the sidelink common search space according to an optimization process based on the received assisting information from other UE in vicinity of the said UE (under power saving constraint). Herein, the assisting information may directly dictates the search space subchannel widths/location for which the power saving UE may conduct or supports the said UE to compute its new optimized search space Wx. If the UE receives multiple assisting information with multiple (different) search space, the said UE may adapt its search space based on, e.g.,

- the union of all proposed search spaces in assisting information received, or
- the common search domain of all the proposed search spaces in the assisting information
- the average search space width FIG. 8 depicts a schematic flow chart for operating the UE. The UE knows (according to knowing means 800), for example via a resource pool configuration, a mapping between a priority class associated with a transmission via a direct mode radio channel, especially via a sidelink channel, and a radio resource offset indicator K0. The UE receives (according to receiving means 810), especially via at least one control radio resource of the direct mode radio channel, control information comprising the priority class. The UE determines (according to determining or processing means 830) the radio resource indicator K0 based on the mapping and based on the received priority class. The UE determines (according to determining or processing means 840) at least one radio resource, especially at least one shared radio resource of the direct mode radio channel, based on the radio resource indicator K0, especially also based on the position of the radio resource on which the control information was received. The UE receives (according to receiving means 850) data via the radio resource of the direct mode radio channel; especially by at least enabling an encoding of at least the determined at least one radio resource of the direct mode channel. The UE reduces (according to reducing means 820) the reception capability on radio resources of the direct mode radio channel, especially at least disabling a decoding of radio resources of the direct mode channel, after receipt of the control information, especially until a subsequent radio resource associated with further control information.

Figure 9:
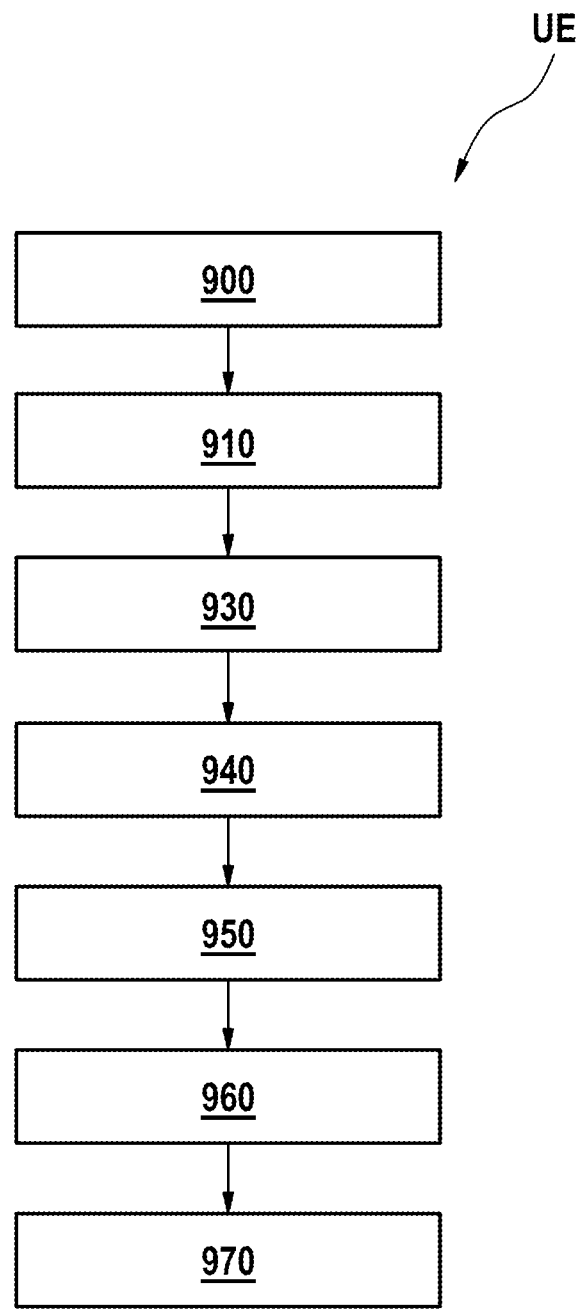

FIG. 9 depicts a schematic flow chart. The UE knows (according to knowing means 900), for example via a resource pool configuration, a mapping between a priority class associated with a transmission via a direct mode radio channel, especially via a sidelink channel, and a radio resource indicator K0. The UE determines (according to determining or processing means 910) a priority class for data to be transmitted. The UE determines (according to determining or processing means 920) a control information comprising the priority class. The UE transmits (according to transmitting means 930), especially via at least one control radio resource of the direct mode radio channel, the control information. The UE transmits (according to transmitting means 940), via a first radio resource, especially via at least one shared radio resource of the direct mode radio channel, the data. The UE determines (according to determining or processing means 950) the radio resource offset indicator K0 based on the mapping and based on the determined priority class. The UE determines (according to determining or processing means 960) a second radio resource, especially at least one shared radio resource of the direct mode radio channel, based on the mapping and based on the determined priority class. The UE re-transmits (according to re-transmitting means 970), via the second radio resource, especially via the at least one shared radio resource of the direct mode radio channel, the data.

So, for example, when sidelink cross-slot scheduling is enabled, the power saving UE may receive in the active time/frequency a sidelink physical channel, wherein the UE is only requested to decode the SCI (e.g., of a 1st stage and/or a 2nd stage) and do not decode the first PSSCH associated with the first SCI.

From the decoded SCI, the UE may extract:
1st the reservations to further transmissions,
2nd the necessity to decode the message, e.g., based on the priority or cast-type or hybrid ARQ (HARQ) type or the UE IDs.
If the UE figures out it needs to decode this transport block, the UE may undergo a micro sleep and only wakes up to decode the second and/or the third retransmission not earlier than a time offset K0, where K0 may be preconfigured or configured per resource pool and/or priority.

Therefore, in an embodiment, the UEs should be configured/pre-configured to do one or more of the following:
Perform a cross slot scheduling either to communicate to power saving UEs; in this case the UE should indicate in its SCI, e.g., by toggling 1 bit, that its supports cross slot scheduling on sidelink
Perform decoding for physical sidelink shared channel (PSSCH) reserved by a physical sidelink control channel arrived, e.g., K0 slots in the past. In this case, the UE will skip decoding the first transmission to save power.
Perform a micro-sleep after every decoded first transmission after decoding the PSCCH. For the second and the third re-transmissions, the UE may also skip PSCCH decoding if it will decode the PSSCH as per cross-slot scheduling over sidelink.
K0 should be configured or preconfigured per resource pool and/or per priority class.

To save power, cross-slot scheduling is used, wherein the UE is able to only decode control in a slot and does not control data that may not be important for the UE. The reason is, if the UE is receiving control that indicates important data in the same slot, the UE may need to buffer all data until the UE completely decode the SCI. If the data was not intended for this UE, the UE will skip it where the power spent to buffer and pre-process the useless data is considered as a waste. On the other hand, if UE is not expecting to decode an SCI and its associated data at the same slot, the UE will perform a Micro-sleep up to the next reserved retransmission by the first SCI.

Figure 10:
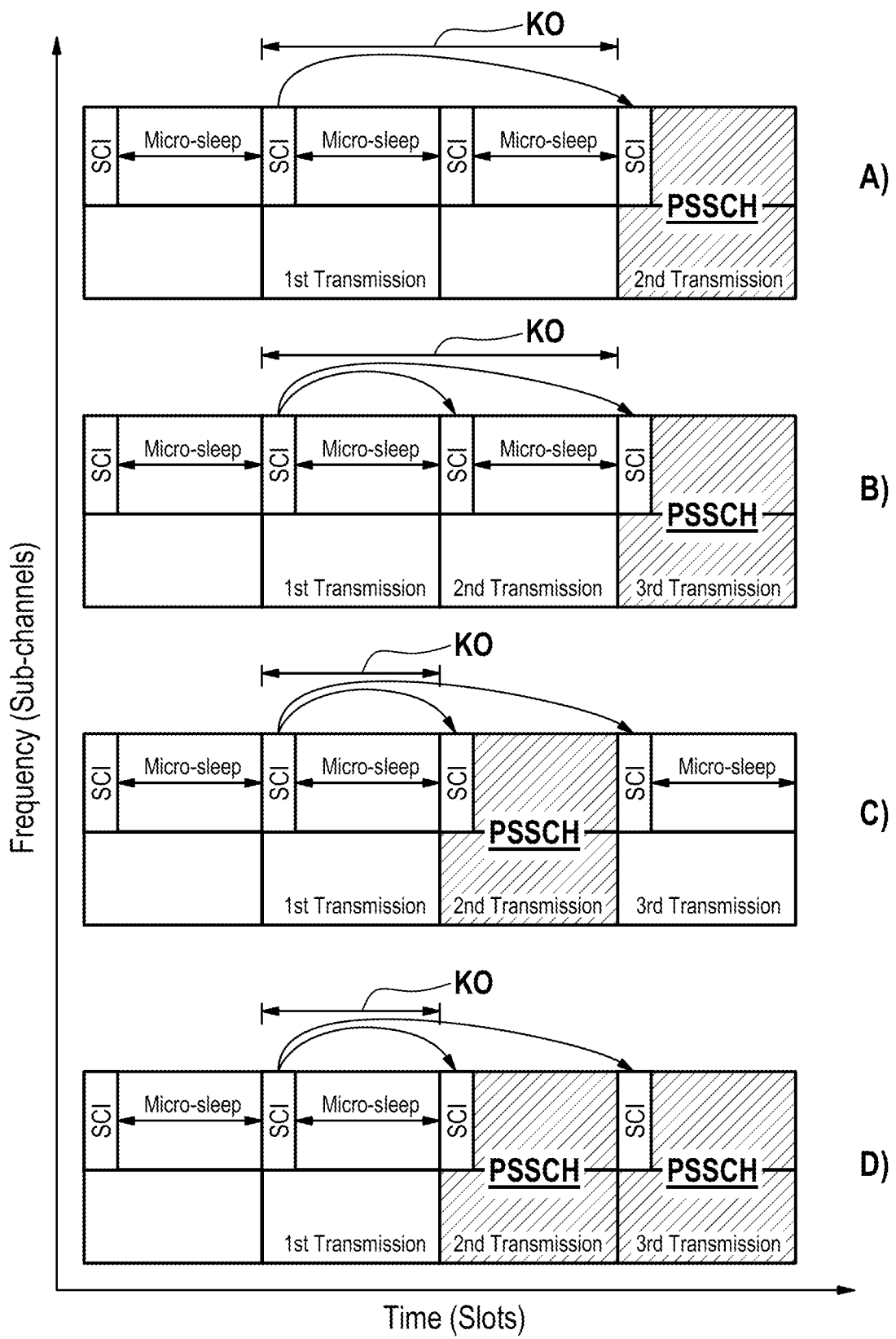
FIG. 10 depicts the case when a cross-slot scheduling/decoding can be configured for Sidelink.

FIG. 10 depicts cross-slot scheduling for sidelink to save UE power. According to an example, the UE is configured to perform a cross-slot scheduling for sidelink, where the UE is configured with multiple K0 offsets associated with multiple priorities and associated to a resource pool. Hence, when the UE receives in a limited frequency space/limited time an SCI, the UE is only requested to decodes the first SCI (e.g., of a 1st stage and/or 2nd stage) and not the associated PSSCH in the same slot with the first SCI. After decoding the first SCI, the UE may extract the necessity to decode this message (transport block) associated to the reservation with the said SCI, e.g., based on the priority in the first stage or the UE IDs in the second stage or cast-type. If the UE figures out it needs to decode this packet, the UE sleeps (performs a micro sleep) for a time not shorter than a specific K0 and wakes up to decode the second and/or the third retransmission associated with this SCI. In this case, the UE is expected to the save power that should have been consumed if the UE would have saved/and processed all RF and digital data for un-intended transmission.

For the K0, the UEs are configured (by a network)/pre-configured (per offline or slowly changing configurations) to have the following per sidelink resource pool and/or per TX priority:

A System information block (SIB) or a dedicated RRC may configure enabling/disabling a cross-slot scheduling one K0_common for all resource pools and priorities, and/or K0's defined Per resource pool per priority class as follows:

| Resource Pool | Priority 0 | Priority 1 |
|---|---|---|
| I | K0_0I | K0_1I |
| L | K0_0L | K0_1L |

If the configuration/pre-configuration comes without the K0 without neither enabling K0_common nor multiple K0's values (per resource pool/per priority), then the UE shall discards cross-slot scheduling, i.e., as if it is deactivated. For any of the K0 configurations, it should not exceed a reservation gap.

In this case, the UE operating with cross-slot scheduling over sidelink can do the following:

Perform a sidelink cross slot scheduling transmission: to communicate to power saving UE, in this case, any sent package for a power saving UE takes place with a retransmission after K0-slots In this case, the sender should consider which re-transmission and redundancy versions should be selected for retransmission.

The UE that performs cross-slot transmission over sidelink signals to the RX UE, e.g., with a 1 bit, that this transmission supports cross-slot scheduling.

Perform a sidelink cross-slot scheduling reception: (as a power saving UE) by only decoding the next subsequent re-transmission referenced in a previous SCI after the preconfigured K0's.

If an RX UE that is configured to perform cross-slot scheduling received a SCI with no-bit enabling As in FIG. 10, When K0 is configured, a power saving UE knows that it has only a cross scheduling capability, therefore the UE will skip decoding the first transmission to save power. Additionally, the UE may perform a micro-sleep after decoded the first PSCCH transmission and rather decode a second and/or a third re-transmissions.

Exception for 1st transmission decoding without micro-sleeping:

If the UE is decoding another second or third retransmission in a slot, fora packet signaled in a previous slot, then the UE may process and decode the data of another first transmission in another subchannel without micro-sleeping. In this case, it may be easier for the UE to save the data than sleeping on some subchannels.

The UE may still perform sensing and CR selection based on the decoded PSCCH in either the first or any subsequent transmission without being affected by the micro-sleeps.

Definitions valid for the whole description:

Slot duration: is 1 ms for 15 kHz subcarrier spacing (SCS) numerology; i.e., 0.5 ms for 30 kHz SCS numerology, 0.25 ms for 60 kHz SCS numerology, and so on.

Sensing window: 1000 slots or 100 slots

Sensing window size: 1000 or 100 times the slot duration in ms

Sub-sensing window: n-Slots*slot duration, e.g., n=10 and slot-duration=1 ms, then—Sub-sensing window duration=10 ms.

Subcarrier=12 in a resources block, with different size per each numerology, e.g., 12*15 kHz=180 kHz for 15 kHz SCS, 12*30 kHz=360 kHz for 30 kHz numerology, etc.

Sub-channel size: composed of K resource blocks, where K is configured per resource pool, e.g., K=4, 5, 10, 20, 30, 50, etc.

Resource Pool: is configured with N adjacent sub-channel (each with width K) and a bit-map of time domain (either consecutive (i.e., all ones)) or non-adjacent (with a bit map composed of 1's and 0's)

Search space: the frequency resources where the UE is expected to receive PSCCH indicating possible PSSCH (data) to decode.

Bandwidth Part (BWP): it is defined in 3GPP NR Sidelink (so do Uu interface) to configure the maximum possible frequency operational band, where the UE is expected to have active communication.

channel occupancy ratio (COR): is defined as the total number of available sub-channels used by the UE for the next transmissions divided by the total number of configured sub-channels over a certain period.

channel busy ratio (CBR): is the portion of resources (in percent) where the received signal strength indication (RSSI) exceeds a certain percentage. E.g., CBR=80% shows that the channel has only 20% of the resources perceived to be free, i.e., lower than the clear channel assessment (CCA) threshold.

Computing the candidate Resources: available candidate resources (CR) selected within a selection window with percentage X %, where X could be {20%, 35%, 50%}.

The invention claimed is:

1. A method for operating an electronic communication device, the method comprising:

determining, in an active mode of the electronic communication device and via a processing unit, a state associated with a direct mode radio channel;

determining, in the active mode, at least one subset of a plurality of radio resources of the direct mode radio channel based on the determined state;

determining, in the active mode, an active mode time period based on the determined state associated with the direct mode radio channel;

determining an end of the active mode time period;
initiating a sleep mode upon the determination of the end of the active mode time period;
determining, in the sleep mode, a sleep mode time period based on the determined state associated with the direct mode radio channel;
determining an end of the sleep mode time period;
initiating the active mode upon the determination of the end of the sleep mode time period, and
performing a cross-slot scheduling including
receiving, in the active mode, first sidelink physical channel information,
decoding a first stage, a second stage, or both, of a first sidelink control information,
determining, based on the decoded information, a necessity to decode a further transmission associated with a reservation in the first sidelink control information based on an indication in the first sidelink control information for a first physical sidelink shared channel associated with the first sidelink control information,
performing a micro-sleep and skipping decoding the first physical sidelink shared channel, and
in response to determining that it is necessary to decode the further transmission, decoding a second retransmission or a third retransmission of the first sidelink physical channel information following the micro-sleep and the skipping of decoding the first physical sidelink shared channel.

2. The method according to claim 1, further comprising:
determining, in the active mode, a search space in frequency in dependence on the determined state associated with the direct mode channel.

3. The method according to claim 2, wherein the search space comprises at least one configured search space that is common for a plurality of apparatuses.

4. The method according to claim 2, wherein the determination of the search space in frequency comprises:
determining a first search space valid for a first period of time during the active mode; and
determining a second search space valid for a second period of time subsequent to the first period in time, wherein the first search space is smaller than the second search space.

5. The method according to claim 2, further comprising:
determining a maximum search space valid for an associated period of time during the active mode time period.

6. The method according to claim 2, further comprising:
receiving, from a plurality of electronic communication devices, sidelink assisting information, each of the sidelink assisting information having a different search space, and
adapting the search space based on the received sidelink assisting information.

7. The method according to claim 6, wherein adapting the search space is further based on at least one selected from the group consisting of a union of all proposed search spaces in assisting information received, a common search domain common to all the different search spaces in the sidelink assisting information, and an average search space width of the different search spaces of the plurality of electronic communication devices.

8. The method according to claim 6, wherein adapting the search space includes increasing the search space.

9. The method according to claim 1, wherein the determining of the active mode time period comprises:
increasing the active mode time period if the state indicates a more congested direct mode radio channel; and
decreasing the active mode time period if the state indicates a less congested direct mode radio channel.

10. The method according to claim 1, wherein the determining of the sleep mode time period comprises:
increasing a search space in frequency if the state indicates a more congested direct mode radio channel; and
decreasing the search space in frequency if the state indicates a less congested direct mode radio channel.

11. The method according to claim 1, further comprising:
listening during a first phase to the direct mode radio channel;
determining, based on the listening, an occupation pattern; and
determining, based on the determined occupation pattern, at least a part of the set of radio resources.

12. The method according to claim 1, further comprising:
determining assisting information for assisting another apparatus in determining at least one subset of a plurality of radio resources of the direct mode radio channel; and
transmitting, via the direct mode radio channel, the determined assisting information.

13. The method according to claim 1 comprising:
receiving, via the direct mode radio channel, assisting information; and
wherein the determination of the at least one subset of a plurality of radio resources of the direct mode radio channel is based on the determined state and is based on the received assisting information.

14. The method according to claim 1, wherein subsequently determined subsets of a plurality of radio resources of the direct mode radio channel overlap in at least one radio resource of the direct mode radio channel.

15. The method according to claim 1, further comprising:
allocating at least one radio resource of the determined subset; and
encoding and transmitting data on the at least one allocated radio resource.

16. The method according to claim 1, further comprising:
decoding data received via the at least one radio resource of the determined subset.

17. The method of claim 1 the method further comprising, following decoding the first sidelink control information, determining the necessity to decode the further transmission associated with the reservation based on a priority in the first stage.

18. The method of claim 1 the method further comprising, following decoding the first sidelink control information, determining the necessity to decode the further transmission associated with the reservation based on an identification of the electronic communication device in the second stage.

19. The method of claim 1 the method further comprising, following decoding the first sidelink control information, determining the necessity to decode the further transmission associated with the reservation based on a cast-type.

20. An electronic communication device comprising:
one or more processors; and
a receiver;
wherein the one or more processors and the receiver are configured to:
determine, in an active mode, a state associated with a direct mode radio channel; and
determine, at least one subset of a plurality of radio resources of the direct mode radio channel based on the determined state;

determine, in the active mode, an active mode time period based on the determined state associated with the direct mode radio channel;

determine an end of the active mode time period;

initiate a sleep mode upon the determination of the end of the active mode time period;

determine, in the sleep mode, a sleep mode time period based on the determined state associated with the direct mode radio channel;

determine an end of the sleep mode time period;

initiate the active mode upon the determination of the end of the sleep mode time period, and perform a cross-slot scheduling including
- receiving, in the active mode, first sidelink physical channel information,
- decoding a first stage, a second stage, or both, of a first sidelink control information,
- determining, based on the decoded information, a necessity to decode a further transmission associated with a reservation in the first sidelink control information based on an indication in the first sidelink control information for a first physical sidelink shared channel associated with the first sidelink control information,
- performing a micro-sleep and skipping decoding the first physical sidelink shared channel, and
- in response to determining that it is necessary to decode the further transmission, decoding a second retransmission or a third retransmission of the first sidelink physical channel information following the micro-sleep and the skipping of decoding the first physical sidelink shared channel.

* * * * *